No. 877,404. PATENTED JAN. 21, 1908.
E. P. BULLARD, Jr.
COMBINED CHANGEABLE SPEED AND BRAKE MECHANISM.
APPLICATION FILED APR. 12, 1906.

3 SHEETS—SHEET 1.

Witnesses
R. H. Newman.
Ruth Raymond

Inventor
Edward P. Bullard Jr.
By Chamberlain & Newman
Attorneys

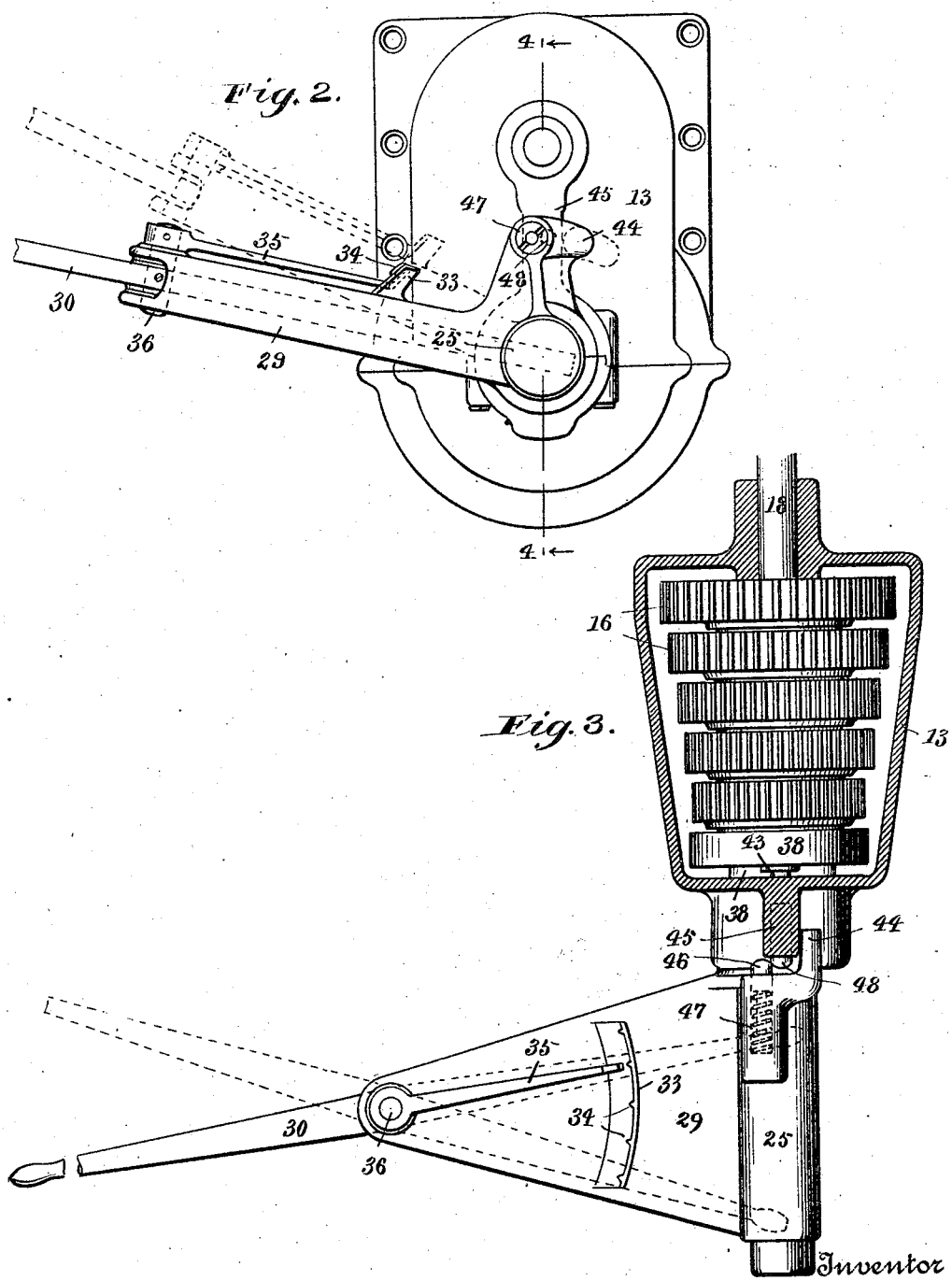

No. 877,404. PATENTED JAN. 21, 1908.
E. P. BULLARD, Jr.
COMBINED CHANGEABLE SPEED AND BRAKE MECHANISM.
APPLICATION FILED APR. 12, 1906.

3 SHEETS—SHEET 3.

Witnesses
R. H. Newman
Ruth Raymond.

Inventor
Edward P. Bullard Jr.
By Chamberlain & Newman
Attorneys

UNITED STATES PATENT OFFICE.

EDWARD P. BULLARD, JR., OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

COMBINED CHANGEABLE-SPEED AND BRAKE MECHANISM.

No. 877,404.      Specification of Letters Patent.      Patented Jan. 21, 1908.

Application filed April 12, 1906. Serial No. 311,285.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Combined Changeable-Speed and Brake Mechanism, of which the following is a specification.

My present invention relates to an improved brake, and speed mechanism, to be used in connection with machine tools as for instance lathes, boring mills, etc.

It is the purpose of my invention to combine a brake and changeable speed mechanism for machines in such a manner as to be operated by a single lever and whereby a number of different changes of speeds may be obtained by the adjustment of the lever in one direction, and whereby the movement of the said mechanism may be quickly stopped by an operation of the said lever in another direction; to provide means for readily determining which of the several speeds are engaged and finally to construct the device in as simple and practicable a manner as possible consistent with the work required.

In the accompanying drawings forming a part of this specification I have shown my invention as applied to one of my improved types of vertical turret lathes, but it will be obvious that the said invention is equally applicable to other forms of machine tools and especially boring mills in connection with which I also use it.

Figure 1:
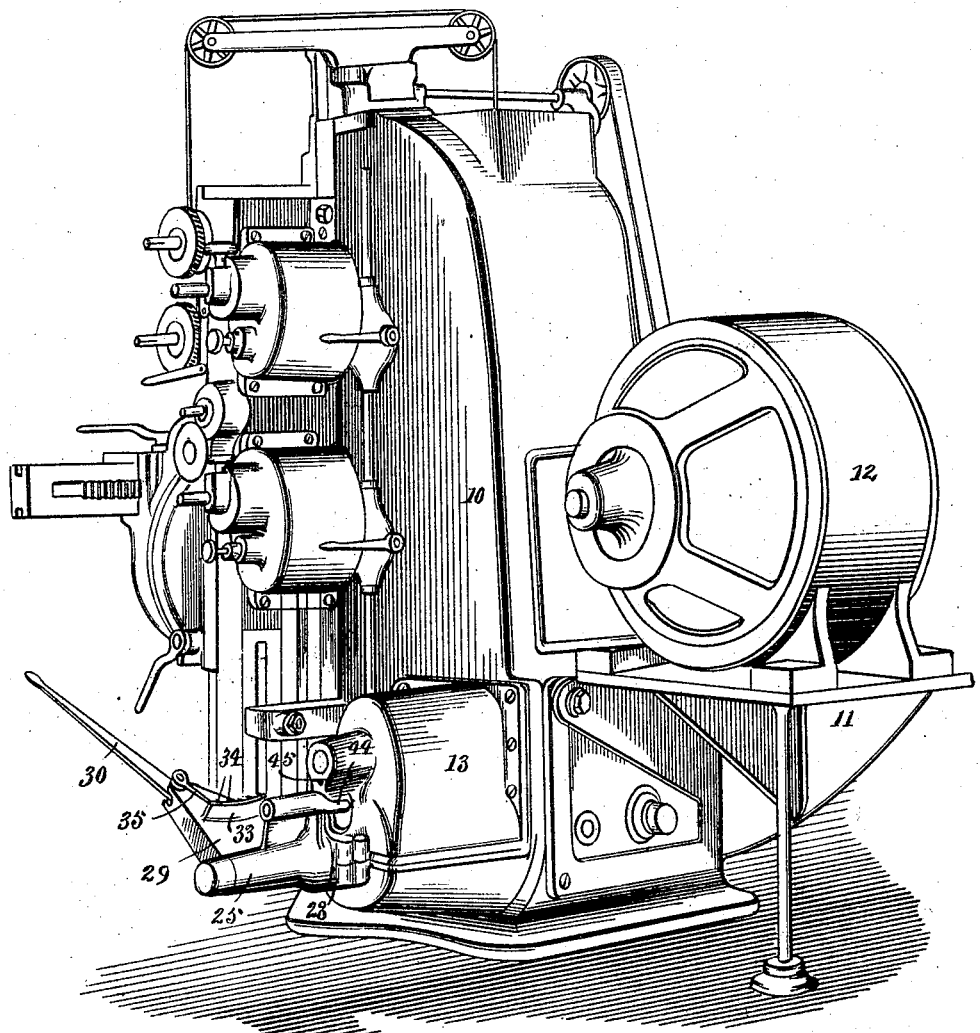
Figure 5:
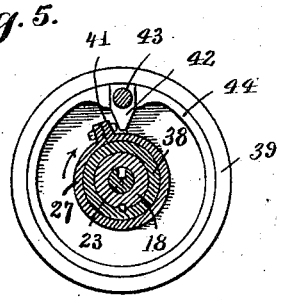
Figure 6:
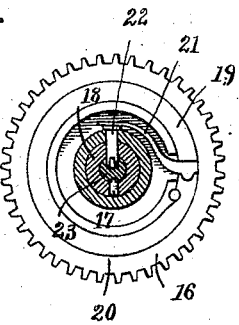
Figure 4:
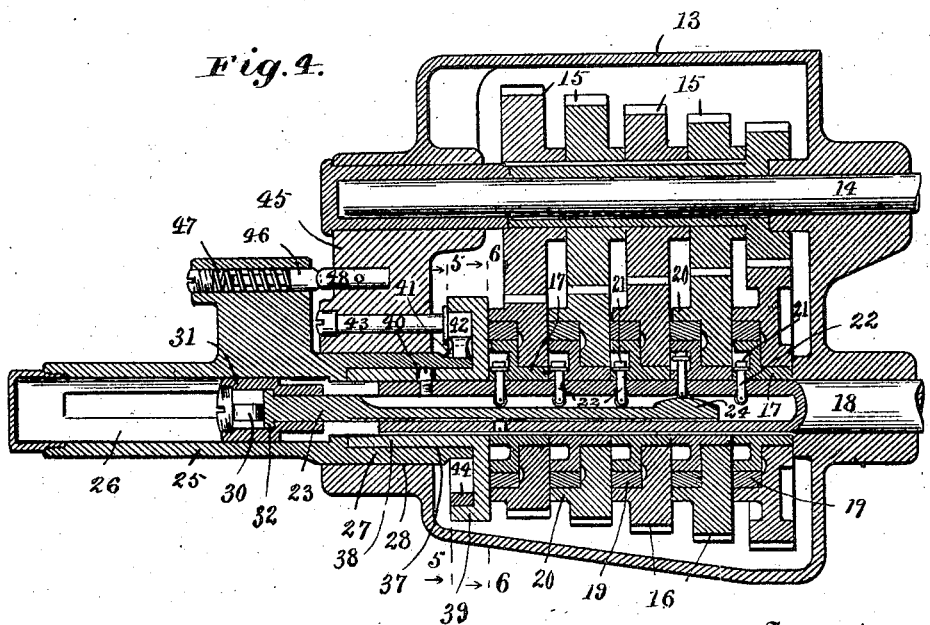

Similar characters of reference denote like or corresponding parts throughout the several figures of the accompanying drawings, and of which, Figure 1, shows a rear perspective view of a vertical turret lathe having my improved brake and speed changing mechanism applied thereto. Fig. 2, is an enlarged front elevation of my novel mechanism as seen in Fig. 1, the operating lever being shown in its normal position by full lines and in its braking position by dotted lines. Fig. 3, is an enlarged sectional plan view, of the series of clutch gears, and the brake clutch, together with lever, and connections for operating the same. Fig. 4, shows a central vertical longitudinal section through the said driving gears, clutches, and brake mechanism, taken on line 4—4 of Fig. 2. Fig. 5, is a similar detail cross section taken on line 5—5 of Fig. 4, and illustrating the brake clutch which is also shown connected in Fig. 4, to be operated by the lever. Fig. 6, is a detail cross sectional view taken on line 6—6 of Fig. 4, illustrating one of the friction clutches shown in said figure and connected to be operated by the lever.

The speed clutches illustrated in connection with the driving gears in the several figures of the drawings are of a preferred design being especially desirable in connection with boring mills and special lathes, yet I do not wish to confine myself to the use of any particular style of clutch or gears as a driving medium since other devices may be found equally as good.

Referring generally to the vertical turret lathe shown in Fig. 1, 10 indicates the frame, 11 a shelf attached thereto and 12 an electric motor upon the shelf and by means of which the tool may be operated, 13 represents a casing attached to the frame and inclosing the driving gears, clutches and brake.

Power is communicated through any suitable line of connections to the driven shaft 14, see Fig. 4, having a series of varying size gears 15, all of which are connected to be rotated with the shaft and in turn mesh with and drive gears 16 loosely mounted on special hubs 17 keyed to the shaft 18 journaled in bearings of the casing. These gears 16 are alike in design but are of varying sizes to connect with the driving gears on shaft 14, and thus each comprises a separate connection designed to drive the shaft 18 at a different rate of speed. Each of these gears 16 is provided with a clutch device for operatively connecting said gear and shaft to effect a driving connection from the shaft 14 to the shaft 18 through any one of the different combinations of gears 15 and 16. The clutches employed within these gears are alike in construction and are substantially what is known as the Rivett clutch. In detail each of these clutches comprises a split ring 19 seated intermediate of the annular flange 20 of the gear and the periphery of the hubs 17. One end of a curved lever 21 is seated intermediate the ends of the split ring while the other end is engaged by a radially disposed pin 22 slidably mounted through the driven shaft 18 and the body portion of the hubs 17. An adjustable grooved rod 23 having a bevel enlargement 24 is slidably mounted within a bore of the shaft 18, and serves to engage the inner ends of the several pins 22 in a way to force the same out and thus operate the spring levers 21. It will be apparent that as the several pins are engaged, the levers operate to expand the split rings against the flanges of the gears, thus forming clutches to effect an operative connection intermediate the hub and gear and from one shaft to the other. The changing from one speed to another is effected by simply sliding the rod inward or outward of the shaft to engage the particular clutch desired as will be fully understood from Figs. 4, 5 and 6.

A bracket 25 is swiveled to the casing 13 and comprises a specially shaped piece, having a cylindrical bore 26 therein and a hub portion 27 that is journaled in a round bearing 28 of the casing, and an extension 29 (see Fig. 3) in which the operating lever 30 is pivoted. Within the cylindrical bore 26 (see Fig. 4) of the bracket is fitted a plunger 31 that contains a socket to receive the inner end of the lever 30 and by means of which said plunger is operated. This plunger further contains a socket to receive the headed end 32 of the slide rod 23. Upon the top of the extension 29 of the bracket is formed a plate 33 (see Figs. 2 and 3) bearing graduations 34 with which the pointer 35 secured to the rocker stud 36 of the lever registers. There are five of these graduation marks upon the plate each one representing a position of the lever for the engagement of one of the clutches. The operating lever is designed to be thrown forward and backward as indicated in full and dotted lines in Fig. 3, or may be adjusted to any intermediate position to engage either of the intermediate clutches.

In addition to the above connection for engaging the several clutches, I also provide brake mechanism, whereby the driving shaft 18 may be readily stopped, by the manipulation of the same lever 30 which is used for operating the clutches in the several gears, which brake is as follows: The hub portion 27 contains an enlarged bore 37 to receive the hub 38 of a clutch disk 39. This disk is secured to the shaft 18 by means of a screw 40, which attaches it in a way to insure its rotation with the shaft at all times when the said shaft is rotated. Upon the periphery of the hub 37 is a lug 41 bearing an adjusting screw designed to impinge against a short arm 42 mounted upon the inner end of a rocker stud 43 pivotally mounted in the casing 13. A split ring 44 is journaled in and against the peripheral flange of the disk 39 with its two ends abutting against the opposite parallel sides of the upper portion of the arm 42.

From the foregoing construction it will be seen that with a slight rotary movement of the hub portion 37 in the direction of the arrow Fig. 5, the screw of the lug 41 impinges against and operates the arm 42 in a way to expand the split ring to frictionally engage the disk and retard its movement. This rotary or braking movement of the hub and the bracket is obviously effected by simply raising the lever as indicated in dotted lines Fig. 2. An extended lug 44 secured to the bracket 25 is designed to engage the side of the web 45 of the casing 13 in a way to normally support the bracket 25 and hub in the position shown in Figs. 2 and 5, disengaged from the brake disk. A spring actuated pin 46 secured in a socket 47 of the bracket serves to frictionally engage a fixed pin 48 secured in the web 45 of the casing 13 and holds the bracket and lever in their upper or locked positions when adjusted to effect the braking operation.

The above mechanism obviously enables the operator to readily shift from one speed to another by a slight horizontal adjustment of the operating lever to engage the respective clutches and also permits the brake to be applied very quickly when the lever is in an intermediate position. If a clutch be engaged the operator would first shift the lever slightly to disengage the clutch, and then raise the lever and bracket in a way to turn the hub and expand the split ring of the brake clutch, the same being accomplished only when the clutches were disengaged.

Having thus described my invention what I claim and desire to secure by Letters Patent is:

1. The combination of a changeable speed driving mechanism, a brake clutch connected therewith, a casing in which they are mounted, a bracket pivoted in the casing connected with and adapted to operate the brake, and means carried within the bracket to operate the changeable speed driving mechanism.

2. The combination of a shaft, changeable speed driving connections mounted thereon, a brake clutch also connected therewith, a casing in which they are mounted, a bracket movably mounted in the casing, connections therewith for operating the brake, a lever pivoted in the bracket for operating the same and for engaging the several driving connections.

3. In a driving device, the combination with a shaft, of one or more clutch connections for operating the same, a brake device upon the shaft, a hubbed bracket journaled to operate the brake device, a single lever pivoted in the bracket and connected with both the clutch mechanisms and brake device for operating both.

4. In a changeable speed device, the combination of a series of driven gears, a series of loose gears to engage the driven gears, clutches in each of said loose gears, a plunger to operate said clutches to engage the loose gears, a hinged lever connected to operate the plunger, an arm attached to the lever and a graduated plate with which the arm registers.

5. In a changeable speed driving device, the combination with a shaft, a series of changeable speed driving connections, of a friction disk attached to the shaft, a clutch device to engage the disk, a rocker bracket adapted to operate the clutch, a lever to manipulate the bracket and also adapted to operate the several clutches of the driving connections.

6. In a changeable speed driving device, the combination with a shaft, a series of clutch connections for operating the same, a plunger for operating the several driving clutches, a friction brake secured to the shaft, a movable bracket connected with and adapted to operate said friction brake, a lever pivoted in the bracket for operating both said braking device and the plunger for the clutches.

7. In a changeable speed driving device, the combination with a shaft, of a series of clutch mechanisms for operatively engaging the shaft with driving connections, means for operating the several clutches, a driven brake disk secured to said shaft, an expandible ring within said disk, a movable bracket connected to operate the ring to engage the disk, a lever pivoted in the bracket to operate the plunger and clutches and also adapted to set the friction brake.

8. In a changeable speed device, the combination with a shaft and variable speed driving connections, of clutch mechanism for each of said driving connections, a plunger for operating the several clutches, a braking clutch mounted upon the same shaft, a rocker bracket journaled upon the shaft to set the clutch of the brake device, means for manipulating the bracket to operate said brake and for operating the plunger of the friction clutches, and means for retaining the bracket in a locked or braked position.

9. In a changeable speed driving device, the combination with a shaft, a series of driving connections including a friction clutch for each of such connections, a plunger for operating said clutches, a friction brake disk secured to the shaft, a split ring within the disk, a rocker stud intermediate the ends of the ring and bearing an arm, a rocker bracket, means for engaging the arm to expand the ring, and a device for operating the bracket to set the brake and to operate the plunger to engage the clutches.

10. In a driving device, the combination with a shaft, changeable speed driving connections bearing clutches for respectively engaging the same, of a brake device comprising a disk fixed to the shaft, an expandible split ring within the disk, a rocker stud to engage the ends of the split ring, a rocker bracket bearing a lug to engage and operate the stud, a lever mounted in the bracket to manipulate the same for the operation of the brake clutch and also adapted to operate the speed clutches, and means for holding the bracket in its braking position.

11. The combination with a shaft, connections for operating the same, of a disk secured thereto, a split ring within the disk, a rocker stud fixed with relation to the movement of the disk and engaging the ring, a bracket bearing a rotatable hub and lug to engage the stud, means for operating the bracket to effect such engagement of the lug and stud, and means for holding the bracket in such engagement.

12. The combination with a shaft, connections for operating the same, of a casing in which the shaft is journaled, a disk secured to the shaft, a split friction ring to engage the disk, a rocker stud mounted in the casing, and extending intermediate of the ends of the split ring, a bracket journaled in the casing bearing a lug to engage the rocker stud for operating the split ring, a handle connected with the bracket for operating the same to lock the bracket, and means for holding said bracket in such locked position.

13. The combination with a shaft and driving connections, of a friction brake, a movable bracket having connections for operating the brake, a lever pivoted in the bracket with means for engaging the several driving connections, a pointer and graduations to indicate the engagement of the driving connections, and means for holding the bracket in its adjusted position for locking the brake.

Signed at Bridgeport, in the county of Fairfield and State of Connecticut this 28th day of March, A. D., 1906.

EDWARD P. BULLARD, Jr.

Witnesses:
  G. N. MOREHOUSE,
  F. J. LOWENSTEIN.